(12) United States Patent
Smith

(10) Patent No.: US 6,729,595 B2
(45) Date of Patent: May 4, 2004

(54) TRAILER LOCK

(76) Inventor: Lonnell E. Smith, 2008 N. Quincy, Tulsa, OK (US) 74106

( * ) Notice: Subject to any disclaimer, the term of this patent is extended or adjusted under 35 U.S.C. 154(b) by 17 days.

(21) Appl. No.: 09/904,341

(22) Filed: Jul. 13, 2001

(65) Prior Publication Data

US 2003/0019260 A1 Jan. 30, 2003

(51) Int. Cl.[7] .............................. B60S 9/02; F16M 13/00
(52) U.S. Cl. ...................... 248/518; 70/235; 248/647; 280/763.1
(58) Field of Search ...................... 70/235, 202, 203, 70/204; 248/159, 407, 685, 647, 518; 280/427, 429, 431, 763.1, 766.1

(56) References Cited

U.S. PATENT DOCUMENTS

| | | | | |
|---|---|---|---|---|
| 2,982,572 A | * | 5/1961 | Farber | 403/219 |
| 3,558,092 A | * | 1/1971 | Hanson | 248/352 |
| 3,695,631 A | | 10/1972 | Schwaiger | |
| 3,785,541 A | * | 1/1974 | Sibley | 180/182 |
| 3,836,173 A | | 9/1974 | Schwaiger | |
| D269,420 S | * | 6/1983 | McClure, Jr. | D12/106 |
| 5,242,178 A | * | 9/1993 | Galasso et al. | 280/204 |
| 5,421,611 A | * | 6/1995 | Peterson et al. | 280/763.1 |
| 5,497,969 A | | 3/1996 | Broughton | |
| 5,599,002 A | * | 2/1997 | Knutson | 70/235 |
| 5,899,101 A | * | 5/1999 | West | 70/238 |

\* cited by examiner

Primary Examiner—Anthony Knight
Assistant Examiner—Christopher Boswell
(74) Attorney, Agent, or Firm—William S. Dorman

(57) ABSTRACT

An anti theft device for a trailer comprising a bracket attached to a side of the trailer, a pipe flattened at one end thereof such that the flattened end is adapted to be received in the bracket, the pipe when received in the bracket and disposed in a vertical relationship being adapted to lift the trailer slightly above the ground so that the bottom of the pipe is in contact with the ground and a lock for locking the pipe to the bracket while maintaining the vertical position of the pipe.

3 Claims, 3 Drawing Sheets

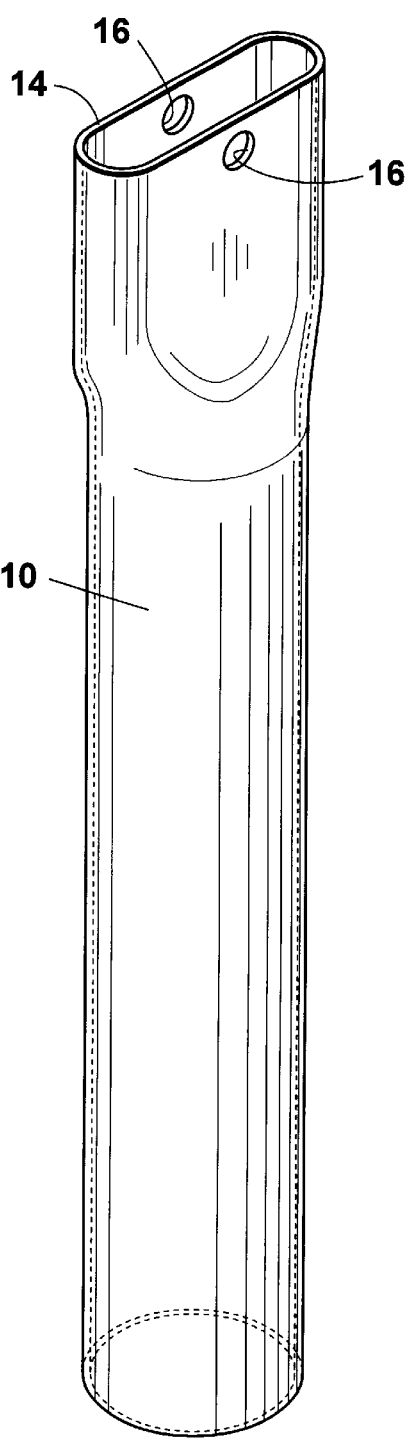
Fig. 1
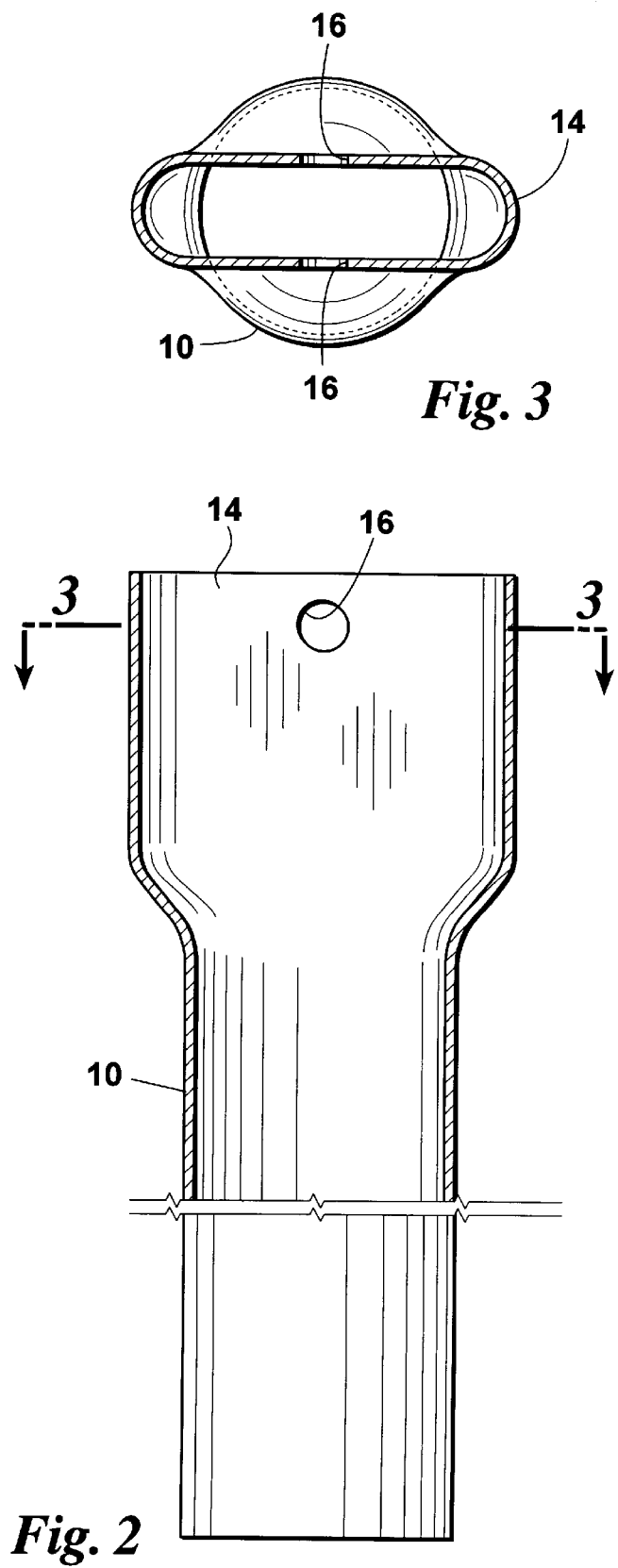
Fig. 3
Fig. 2

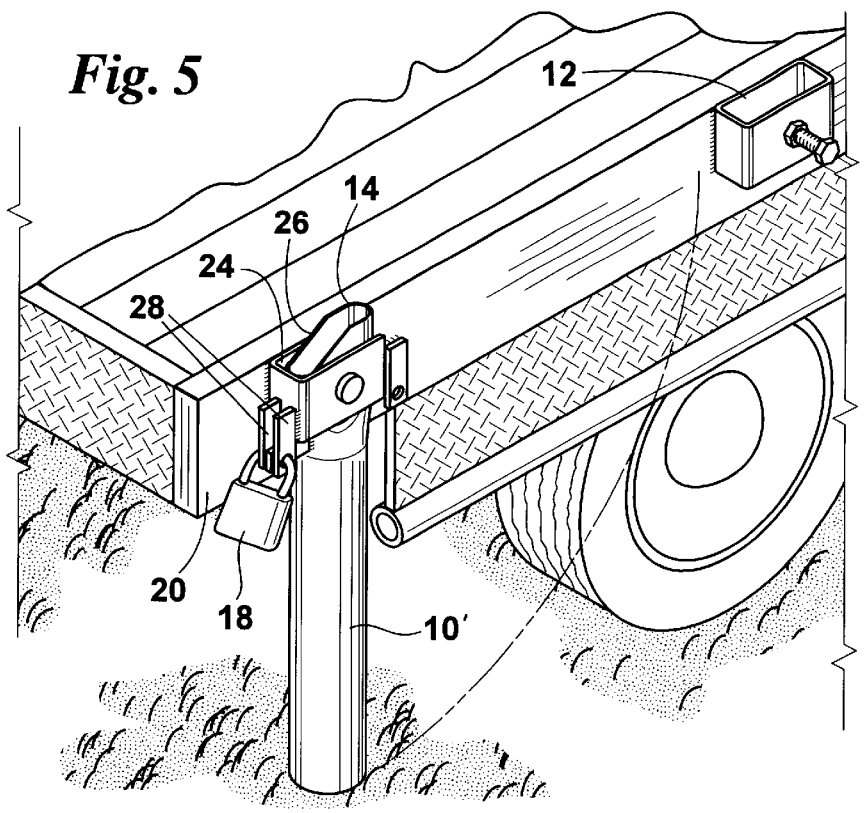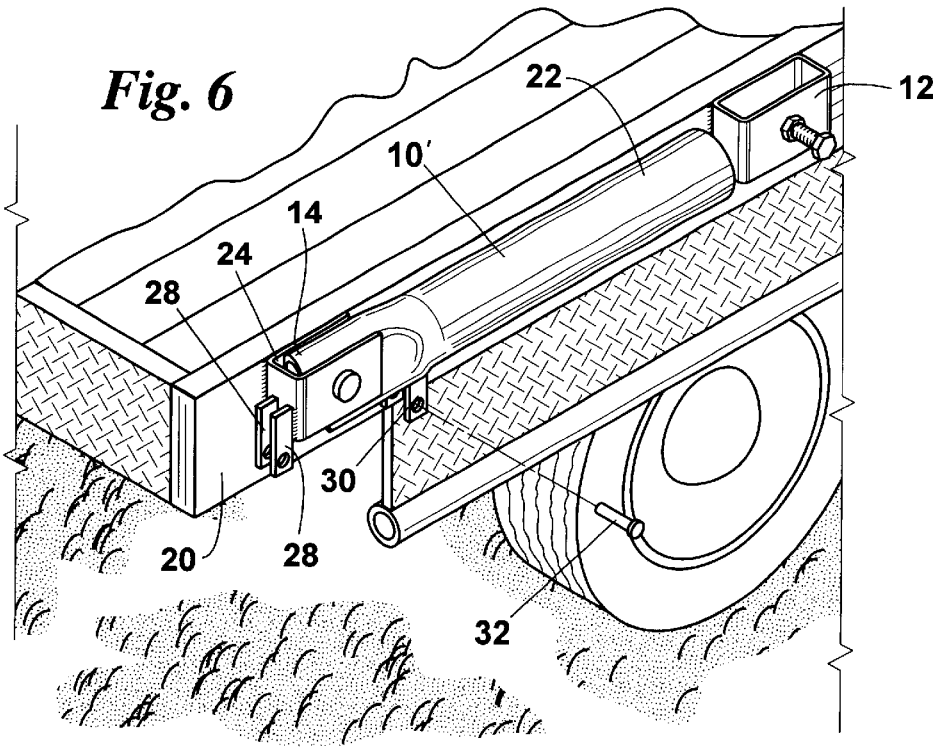

TRAILER LOCK

BACKGROUND OF THE INVENTION

1. Field of the Invention

The present invention relates to a device to prevent or discourage the theft of trailers which are towed by trucks or automobiles. More particularly, the present invention relates to a leg or jack that is placed on the periphery of the trailer to retard the withdrawal of the trailer from where it has been parked.

2. Prior Art

There are numerous devices which purport to prevent or mitigate the theft of trailers. A preliminary search was conducted on the present invention and the following references were uncovered in the search;

| Inventor | Patent No. | Date |
| --- | --- | --- |
| McClure, Jr. | Des. 269,420 | Jun. 21, 1983 |
| E. R. Gilkison | 1,727,430 | Aug. 1, 1928 |
| P. A. Skinner | 2,162,181 | Jun. 16, 1938 |
| S. Strand | 2,571,390 | Feb. 2, 1950 |
| Schwaiger | 3,695,631 | Oct. 3, 1972 |
| Schwaiger | 3,836,173 | Sep. 17, 1974 |
| Scully | 4,921,269 | May 1, 1990 |
| Patterson | 4,993,677 | Feb. 19, 1991 |
| Baker | 5,067,746 | Nov. 26, 1991 |
| Broughton | 5,497,969 | Mar. 12, 1996 |

U.S. Pat. No. 3,695,631 to Schwaiger, while generally relevant, does not disclose a pipe going through a bracket on the side of the trailer. Schwaiger does disclose a vertical leg 8 which fits into a specially designed trapezoidal member which in the end view of FIG. 2 appears as a U-Shaped member 12 attached to the underside of the trailer. As shown in FIGS. 3 and 4 and described on Page 2, the upper end of the leg is locked by means of a padlock 20 using a somewhat complicated box structure. The purpose of this device is to prevent the theft of the trailer using a different and more costly arrangement.

U.S. Pat. No. 5,497,969 to Broughton shows a releaseable locking device which does not extend through a bracket on the side of the trailer but, rather, attaches to a draw bar 16 which is, in turn, attached to the trailer by means of a coupling 17 as shown in FIG. 2. The post 10 is provided with a plurality of holes 13 through which a pin 21 is adapted to project and through holes 35 on opposite sides of a saddle 28. The end of the pin 21 is provided with a flattened portion 24 and a hole or bore 25 through the flattened position. As described in relation to FIGS. 5 and 6, a locking mechanism operated by means of a key (not shown) is adapted to go through the hole 25 in the pin and thereby lock the leg in a the vertical position.

U.S. Pat. No. 3,836,173 to Schwaiger shows a pair of legs which are used to hold the trailer in an elevated position. The trailer is a closed device and therefore the only way anyone can get access to the tops of the legs is by getting inside the trailer. Therefore, if the trailer is locked, the thief will have to break into the trailer before attempting to move the legs.

The remaining references, referred to on Page 1, which are not specifically discussed are not considered to warrant any comment.

SUMMARY OF THE INVENTION

The present invention relates to an anti theft device which involves a pipe and a bracket on the side of a trailer. The pipe is of sufficient length, when vertical, to hold the trailer slightly above the ground and slightly higher than the trailer would be if the pipe had not been attached. The pipe which constitutes a leg is flattened at the upper end so that it will fit into the bracket.

In one form of the present invention, the bracket is a rectangular bracket with a rectangular opening and the upper flattened end of the leg or pipe projects upwardly through the rectangular opening in the rectangular bracket and the projecting portion is provided with a pair of holes in which a padlock can be received. With the padlock in place the leg cannot be removed from the bracket and thus, this constitutes an anti theft device in that anyone wishing to quickly steal the trailer would be prevented from doing so. First of all, the bottom of the leg is going to drag on the ground. Secondly, the thief is going to make some noise and disturbance so that it would be inconvenient for him to make a quick get away with the trailer.

Another form of the invention involves a bracket which is opened at one side end. This can be accomplished by taking one of the normal brackets that exists on the side of a trailer and removing the rear end portion. The leg or pipe, as before, will have a flattened end which is adapted to be received in this bracket which is essentially a C-bracket with the opening of the "C" facing towards the rear. The upper end of the pipe, in this case, however, is pivotally mounted in the bracket by means of a pivot pin or bolt. Also the upper flattened end of the pipe will be cut off at a slant so that it can freely pivot from its vertical position to a horizontal storage position along the side of the trailer. The closed side of the bracket; i.e. the side of the bracket which is opposite from the open side, is provided with a pair of vertically extending parallel ears which project horizontally out from the bracket. These ears are provided with aligned holes. Similarly, the pipe is provided with a tab which projects horizontally between the two ears when the pipe is in the vertical position. The tab has a hole in it in alignment with the two holes in the two ears such that a padlock can be placed through these three aligned holes to secure the second modification of the pipe in the vertical position. For storage purposes, with respect to the second embodiment, a pin is provided to simply pass through the hole in the tab and another hole in the side of the trailer to hold the leg in a horizontal position.

BRIEF DESCRIPTION OF THE DRAWINGS

FIG. 1 is a perspective view of the pipe which is used in conjunction with a bracket on the trailer to support the trailer bed in an elevated position to prevent or discourage the theft of the trailer.

FIG. 2 is a side elevation, with certain parts in section and with the pipe being broken to show a considerable length.

FIG. 3 is a vertical section of the pipe in FIG. 2 taken along section line 3—3 of FIG. 2.

FIG. 5 is a view of a modified form of the present invention utilizing a slightly modified form of pipe and having a bracket which is opened at one end to permit pivotal movement of the leg from a vertical position to a horizontal storage position coextensive with the side of the trailer.

FIG. 6 is view similar to FIG. 5 and showing the pipe in the horizontal position.

DETAILED DESCRIPTION OF THE PREFERRED EMBODIMENTS

Figure 4:
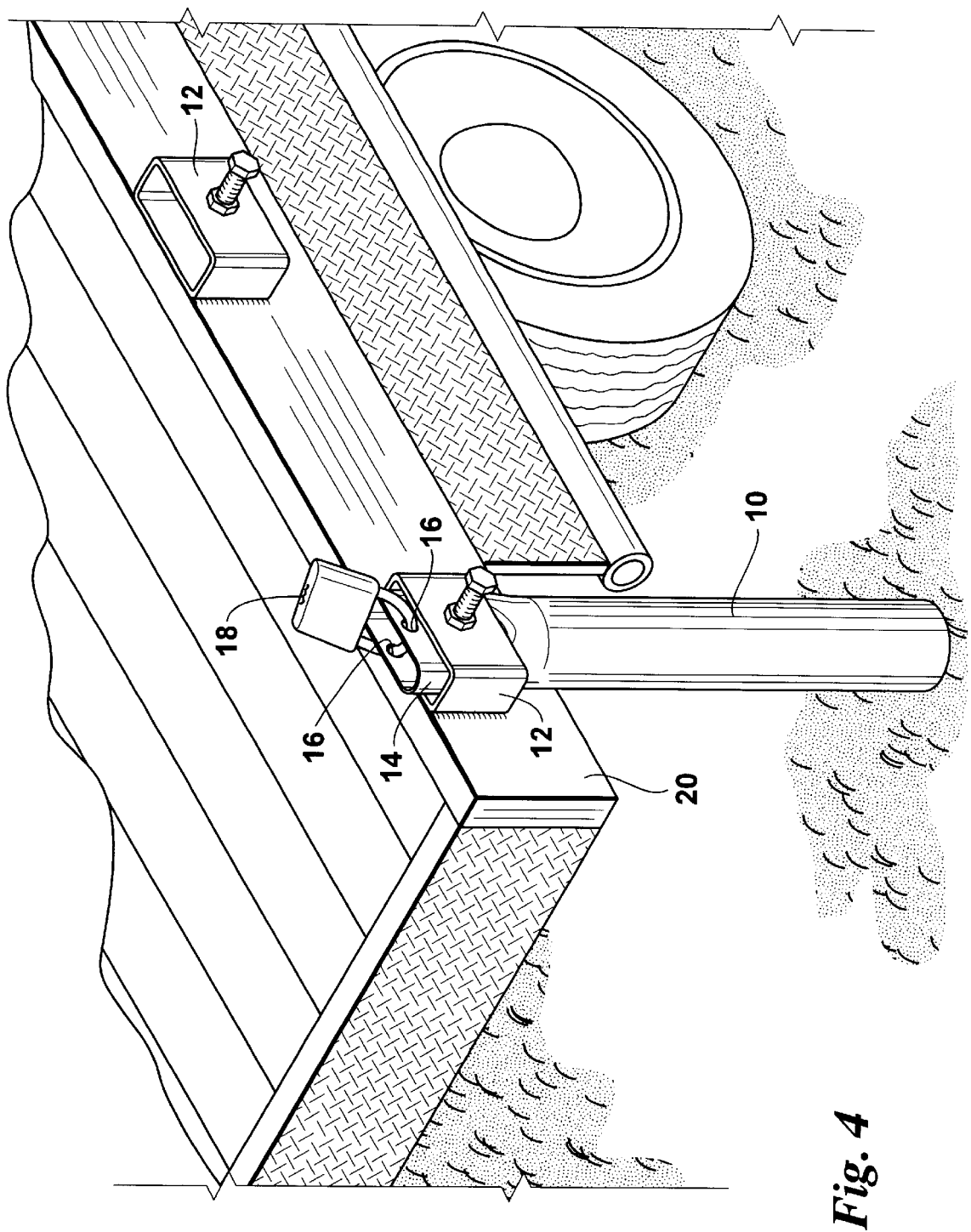
FIG. 4 is a perspective view of one corner of a trailer showing the pipe in FIGS. 1 to 3 as being inserted in a bracket on the periphery of the trailer and locked in place with a padlock.

Referring to FIG. 4, there is shown a trailer 20 with a pipe 10 adapted to be received in a rectangular opening in a rectangular bracket 12 which normally exists on the end or even around the periphery of the trailer 20 below the bed 21 thereof, generally for the purpose of putting in two by fours to form a super structure or to hold on a gate, etc. The trailer 20, for the purpose of this invention is preferably a flat-bed trailer mounted on wheels as shown, and adapted to be pulled by a vehicle (not shown).

The bracket 12 has a length, as best shown in FIG. 4, which is parallel to the longitudinal direction of the trailer 20 and a width which is at right angles (transverse) thereto. The pipe 10 is normally cylindrical having a diameter exceeding the width of the bracket 12. When the end of the pipe 10 is flattened at shown in FIG. 1, it has a flattened end 14 which is essentially equal to the width of the opening in the bracket 12 and a length which is also less than the length of the opening in the bracket 12. When the flattened end 14 is inserted into the bracket 12 the bottom of the bracket will rest against the rounded portion of the pipe 10 below the flattened end 14.

In any event, the pipe 10 has a flatted end 14 (see also FIGS. 1 to 3) which is received in the bracket 12 and passes through the bracket so that the holes 16 which are in the flattened end are actually located above the upper end of the bracket. At this time a padlock 18 can be put through the holes 16 of the flattened end of the pipe. At the time that the pipe 10 is inserted in the bracket 12, it is assumed that the forward end of the bed 21 is somewhat lower (in the region of the bracket 12) than the rest of the bed. Thus, it will be generally necessary to lift the trailer somewhat before putting the pipe 10 in the bracket 12.

This pipe 10 constitutes a lock in the sense that one would have to lift the end of the trailer 12 adjacent the pipe 10 so as to get it off the ground. Otherwise, the pipe would dig into the ground and prevent easy removal of the trailer from where it is positioned. This anti theft arrangement is not considered to be absolutely full proof, but it is going to require a little time for the thief to maneuver and he probably will be making noise which might lead to his lack of success in stealing the trailer.

FIGS. 5 and 6 represent a variation of the pipe 10' wherein a different type of locking arrangement is employed with a modified form of bracket. That is, the forward bracket 24 as shown in FIGS. 5 and 6 can be a modified form of the bracket 12 where the rear end portion of the bracket is removed, or it can be a bracket that is formed initially from a C-shaped member which is welded to the side of the trailer 12 so that the rear end portion of the bracket 24 is open to permit the pipe 10' to pivot upwardly around the pivot bolt 23 to the position 22 as shown in FIG. 6. More particularly, the flattened end 14 is cut at a taper 26 so that the upper end of the pipe 10' will miss the left hand end of the bracket 24 when it pivots from the FIG. 5 position to the FIG. 6 position. Also, the forward end of the bracket 24 is provided with a pair of spaced and parallel ears 28 which have aligned holes therein as shown. Correspondingly, the side of the leg is provided with a tab 30 which also has a hole therein such that when the pipe 10' is pivoted to the position shown in FIG. 5, the tab will be positioned between the two ears 28 and the holes of these three members will be in alignment so that a padlock 18 can be inserted through these three holes to lock the leg 10' in the FIG. 5 (vertical) position.

If it is desired to lock the leg in the horizontal storage position shown in FIG. 6, a locking pin 32 can be provided so that the pin will go through the hole provided in the tab 30 and into another hole (not shown) in the side of the trailer 12.

Whereas the present invention has been described in particular relation to the drawings attached hereto, it should be apparent that other and further modifications of the present invention, apart from those shown or suggested herein, may be made within the spirit and scope of this invention.

What is claimed:

1. An anti theft device for a trailer which is adapted to be towed by a vehicle comprising a pre-existing bracket attached to a side of the trailer the bracket having a opening whose length extends parallel to the longitudinal direction of the trailer and whose width is transverse thereto, a cylindrical pipe flattened at one end thereof such that the flattened end is adapted to be received in the bracket, the diameter of the cylindrical portion of the pipe exceeding the width of the opening in the bracket, the pipe when received in the bracket and disposed in a vertical relationship being adapted to lift the trailer slightly above the ground and die bottom of the bracket being in contact with the cylindrical portion of the pipe below the flattened end thereof.

2. An anti theft device as set forth in claim 1, wherein the bracket is of rectangular shape with a rectangular opening therein, wherein the flattened end of the pipe projects upwardly through the bracket, where the upwardly projecting portion of the pipe is provided with aligned holes through which a padlock may be inserted to lock the pipe in a vertical position with respect to the bracket.

3. An anti theft device as set forth in claim 1, wherein the bracket is opened at a rear end thereof, wherein the flattened end of the pipe is received in the bracket, wherein the upper end of the pipe is pivotally mounted in the bracket, wherein a portion of the flattened end is cut away to permit pivoting of the pipe from a vertical position to a horizontal storage position without interference with the side of bracket, the bracket being provided with a pair of vertically extending parallel ears which project forwardly from a closed end of the bracket, the ears having aligned holes therein, wherein the pipe is provided with a tab projecting at right angles to the pipe and being located along the pipe such that it is interposed between the two ears of the bracket, when the pipe is vertical, the tab having a hole therein so that when the leg is in the vertical position a padlock can pass through the three holes in the two ears and the tab to lock the leg in a vertical position, wherein a locking pin is provided to pass through the hole in the tab and another hole in the side of the trailer to hold the leg in a horizontal storage position when the padlock has been removed.

* * * * *